(12) United States Patent
Shimura et al.

(10) Patent No.: US 6,600,837 B1
(45) Date of Patent: Jul. 29, 2003

(54) IMAGE COMPRESSION CONTROLLER AND IMAGE PICKUP SYSTEM USING THE SAME

(75) Inventors: Katsuharu Shimura, Kanagawa (JP); Takunari Inagaki, Saitama (JP)

(73) Assignee: Sony Corporation, Tokyo (JP)

( * ) Notice: Subject to any disclaimer, the term of this patent is extended or adjusted under 35 U.S.C. 154(b) by 490 days.

(21) Appl. No.: 09/589,714

(22) Filed: Jun. 8, 2000

(30) Foreign Application Priority Data

Oct. 6, 1999  (JP) .......................................... 11-163405

(51) Int. Cl.$^7$ ................................................. G06K 9/36
(52) U.S. Cl. ..................................................... 382/239
(58) Field of Search ............................... 382/232–235, 382/238–240, 244–248, 250–253; 348/384.1, 394.1–395.1, 400.1–404.1, 407.1–416.1, 420.1–421.1, 425.2, 430.1–431.1, 699, 700, 701; 358/426, 427, 261.1–261.3, 430–433; 375/240.02–240.03, 240.11–240.16, 240.18–240.2, 240.22–240.25

(56) References Cited

U.S. PATENT DOCUMENTS 5,778,102 A * 7/1998 Sandford, II et al. ....... 382/251
5,966,465 A * 10/1999 Keith et al. .................. 382/232
6,298,166 B1 * 10/2001 Ratnakar et al. ............ 382/248

* cited by examiner

*Primary Examiner*—Jose L. Couso
(74) *Attorney, Agent, or Firm*—Frommer Lawrence & Haug LLP; William S. Frommer

(57) ABSTRACT

An image compression controller capable of simplifying the quantization coefficient control in an image compression process and attaining a high speed In image compression, including a first quantization circuit for first quantization based on a quantization coefficient on an output signal from a DCT circuit, a second quantization circuit for second quantization based on a second quantization coefficient, counters for counting the number of "0's" in the first quantization data, a quantization coefficient control circuit for generating a plurality of reference control coefficients and generating control coefficients based on counts of the counters and a "0" reference value, a first multiplier for generating a first quantization coefficient based on a reference quantization coefficient and a reference control coefficient, a second multiplier for generating a second quantization coefficient based on a control coefficient and a reference quantization coefficient, and an entropy coding circuit for entropy coding on the second quantization data.

22 Claims, 14 Drawing Sheets

FIG.5

ACTUAL EXAMPLES OF COMPRESSION

SIZE OF SAMPLE IMAGE: 480×480, 4:2:2
DATA BOX UPPER LINE: JPEG FILE SIZE (KB: Kilobyte)
LOWER LINE: NUMBER OF "0" AFTER QUANTIZATION

| CONTROL COEFFICIENT | SAMPLE IMAGE A ○ | SAMPLE IMAGE B ● | SAMPLE IMAGE C × | SAMPLE IMAGE D ⊗ | SAMPLE IMAGE E ▲ | SAMPLE IMAGE F ⊙ | SAMPLE IMAGE G ◯ | SAMPLE IMAGE H ▼ |
|---|---|---|---|---|---|---|---|---|
| 2.0 | 42KB 446,028 | 37KB 454,384 | 40KB 449,320 | 40KB 449,957 | 36KB 457,670 | 41KB 446,953 | 41KB 447,538 | 39KB 450,994 |
| 1.8 | 43KB 443,880 | 38KB 453,425 | 41KB 447,220 | 41KB 447,461 | 37KB 456,200 | 43KB 444,545 | 42KB 444,843 | 40KB 449,280 |
| 1.5 | 44KB 441,537 | 39KB 452,492 | 43KB 444,333 | 42KB 444,707 | 39KB 453,731 | 44KB 441,728 | 44KB 441,499 | 41KB 447,574 |
| 1.2 | 46KB 437,901 | 40KB 450,955 | 45KB 440,361 | 45KB 440,137 | 41KB 450,260 | 46KB 437,236 | 46KB 436,592 | 43KB 444,625 |
| 1.0 | 48KB 434,429 | 41KB 448,719 | 47KB 435,181 | 48KB 434,311 | 43KB 445,048 | 49KB 432,255 | 49KB 430,795 | 45KB 441,041 |
| 0.8 | 51KB 429,492 | 42KB 446,297 | 50KB 428,498 | 51KB 426,885 | 45KB 437,940 | 52KB 425,558 | 53KB 442,992 | 48KB 435,952 |
| 0.5 | 58KB 416,727 | 46KB 438,290 | 60KB 410,376 | 61KB 407,414 | 55KB 418,028 | 62KB 408,099 | 64KB 402,442 | 55KB 421,183 |
| 0.3 | 69KB 400,632 | 53KB 426,218 | 73KB 386,558 | 76KB 380,804 | 69KB 390,550 | 76KB 385,216 | 79KB 376,074 | 67KB 400,222 |
| 0.2 | 79KB 383,343 | 61KB 412,013 | 88KB 360,281 | 93KB 348,642 | 84KB 358,326 | 91KB 358,451 | 95KB 346,641 | 81KB 357,294 |
| 0.1 | 104KB 347,103 | 78KB 383,245 | 120KB 304,207 | 129KB 283,704 | 118KB 291,082 | 125KB 291,082 | 130KB 285,355 | 112KB 317,101 |

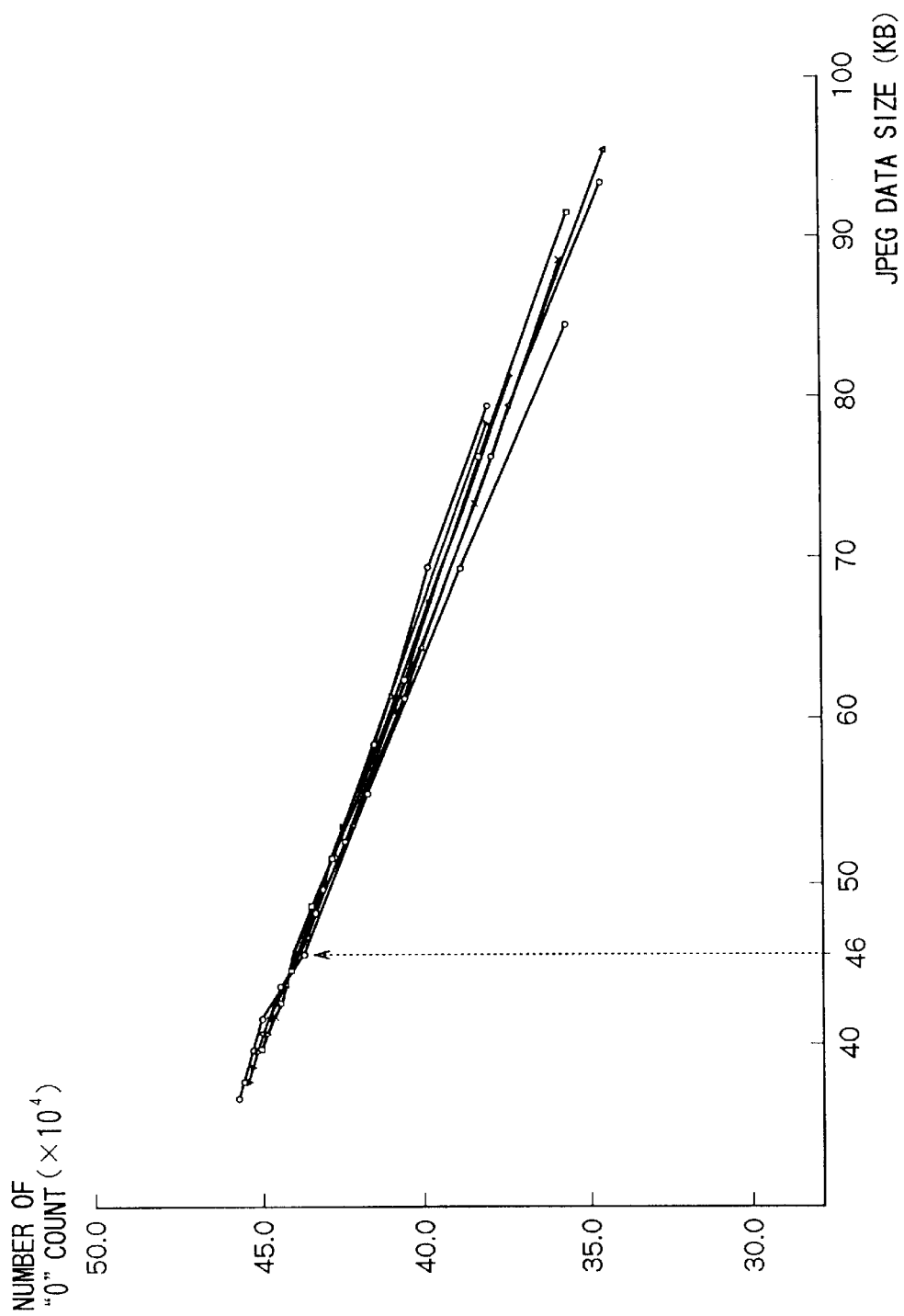

IMAGE COMPRESSION CONTROLLER AND IMAGE PICKUP SYSTEM USING THE SAME

BACKGROUND OF THE INVENTION

1. Field of the Invention

The present invention relates to an image compression controller applied, for example, for a digital still camera system and compressing image data to generate an image file of a size of not more than a set size and an image pickup system using the same.

2. Description of the Related Art

Compression based on for example the Joint Photographic Experts Group (JPEG) standard of still images may be roughly divided into generally the four processes in order: discrete cosine transform (DCT) processing; quantization; entropy coding; and JPEG file formatting.

Here, the DCT circuit performs orthogonal transform processing applying two-dimensional DCT on original image data to remove the spatial relationship, focusing the energy on some coefficients, and compressing and coding so-called redundancy.

The quantization approximates the data with the compressed redundancy at a discrete level.

The entropy coding assigns codes for every quantization output so that the average code length becomes short.

The JPEG file formatting produces a JPEG file of a size of not more than a set size from the entropy coded data.

The final JPEG data is obtained by all these processings, so the data size is found after completing the processing.

Also, the JPEG data size, or the compression rate, changes in accordance with the control of a quantization coefficient in the quantization stage.

Controlling the JPEG data size to be a desired size becomes possible by repeatedly performing the above processing while changing the quantization coefficient.

However, the method of controlling the JPEG data size to be a desired size by changing the quantization coefficient requires a long processing time.

Especially, in a digital still camera system etc., since the capacity of the storage medium for storing the JPEG file is limited, when compressing a photographed still image, control is required so that the final JPEG data does not become larger than a certain size.

Accordingly, a digital still camera system etc. is provided with an image compression controller for changing the quantization coefficient by for example an image quality mode so as to control the size of the JPEG data.

FIG. 13 is a block diagram of an example of the configuration of this type of image compression controller.

An image compression controller 10 comprises a DCT circuit 11, a quantization circuit 12, an entropy coding circuit 13, a size measurement circuit 14, a quantization coefficient control circuit 15, a quantization table 16 stored in a storage circuit, and a JPEG file maker 17.

In the DCT circuit 11 of the image compression controller 10, as shown in FIG. 14, a discrete cosine transform on is performed with respect to the input original image data and the result is output as data D11 to the quantization circuit 12 (ST1, ST2).

In the quantization circuit 12, the data D11 based on a quantization coefficient S15 given by the quantization coefficient control circuit 15 is quantized (ST3) and the result is output as data D12 to the entropy coding circuit 13.

At this time, the quantization coefficient given by the quantization coefficient control circuit 15 is given by selecting a coefficient having a low compression rate at the time of initialization from the quantization table 16.

In the entropy coding circuit 13, codes are assigned to the quantization data D12 so that the average code length becomes short (ST4) and the result is output as data D13 to the size measurement circuit 14 and the JPEG file maker 17.

In the size measurement circuit 14, the size of the entropy coded data D13 (ST5) is measured and the measured size is output as a signal S14 to the quantization coefficient control circuit 15.

In the quantization coefficient control circuit 15, the signal S14 is received and the judgement is performed whether the entropy coded data size is less than a set predetermined size (ST6).

When the quantization coefficient control circuit 15 judges that the entropy coded size is larger than the set size at step ST6, a signal S15a indicating the judgement is output to the JPEG file maker 17, selected a quantization coefficient which gives a little higher compression rate than that at first from the quantization table 16, and this is given to the quantization circuit 12 (ST7). At this time the JPEG file maker 17 does not make a file.

The processing of steps ST1 to ST7 is then repeated until it is judged at step ST6 that the entropy coded data size is less than the set size.

In this repeated processing, the compression is performed while changing the quantization coefficient for each repetition, The quantization coefficient is selected and given to the quantization circuit 12 so that the compression rate becomes gradually higher.

When judging at step ST6 that the entropy coded data size is less than the set size, a signal S15a indicating the judgement is output to the JPEG file maker 17 by the quantization coefficient control circuit 15.

Then, in the JPEG file maker 17, a JPEG file based on the entropy coded compression image data D13 of the size less than the set size is made and output (ST8).

Summarizing the problem to be solved by the invention, in the above image compression controller, due in part to the fact that the compression rate ends up becoming higher than necessary depending on the input image data, when trying to flexibly change the quantization coefficient for every image in order to obtain a better image quality within the limited capacity, the processing process increases due to the repetition of compression as explained above etc. and the processing time ends up increasing as well along with the number of repetitions.

Further, since the number of repetitions differs in accordance with an input image, the processing time is liable to end up becoming uneven.

Especially, entropy coding generally requires a long processing time, so repetition of the processing many times has a large effect on the overall processing time.

Also, even if increasing the clock frequency or tinkering with the circuit configuration so as to increase the speed of processing of each block, the processing is wasted the more the number of repetitions and is difficult to make the best use of the improved performance.

SUMMARY OF THE INVENTION

An object of the present invention is to provide an image compression controller capable of simplifying the quantization coefficient control in an image compression process and increasing the speed of image compression and an image pickup system using the same.

According to a first aspect of the present invention, there is provided an image compression controller for compressing image data to generate an image file having a size smaller than a set size, comprising a compression circuit for compressing redundancy of input image data for coding; a quantization circuit for first quantization based on a first quantization coefficient and second quantization based on a second quantization coefficient on an output signal of the compression circuit; a counter for counting the number of a quantization value having correlation with a size of an image file generated among quantization values included at least in first quantization data from the quantization circuit; a quantization coefficient control circuit for generating a control coefficient based on the count of the counter and a reference value of a quantization value having correlation with a size of an image file generated set in advance; a quantization coefficient generation circuit for supplying a reference quantization coefficient set in advance as the first quantization coefficient to the quantization circuit, generating the second quantization coefficient based on the control coefficient and the reference quantization coefficient, and supplying the same to the quantization circuit when a control coefficient from the quantization coefficient control circuit is received; and an entropy coding circuit for entropy coding on the second quantization data from the quantization circuit.

Preferably, the counter further counts the number of a quantization value having correlation with the size of the image file generated among quantization values included in the second quantization data from the quantization circuit; the quantization coefficient control circuit again generates a control coefficient based on the number of a quantization value having correlation with the size of the image file generated included in the second quantization data from the counter and the reference value and outputs a control signal indicating that the control coefficient is again generated to the entropy coding circuit; the quantization coefficient generation circuit again generates a second quantization value based on the again generated control coefficient and the reference quantization coefficient; the quantization circuit quantizes an output signal of the compression circuit based on the again generated second quantization coefficient and outputs the quantization data to the entropy coding circuit; and the entropy coding circuit performs entropy coding on the quantization data based on the again generated second quantization coefficient upon receiving the control signal.

According to a second aspect of the present invention, there is provided an image compression controller for compressing image data to generate an image file having a size smaller than a set size, comprising a compression circuit for compressing redundancy of input image data for coding; a plurality of quantization circuits for first quantization based on a first quantization coefficient and second quantization based on a second quantization coefficient by a specific circuit on an output signal of the compression circuit; a plurality of counters for each counting the number of a quantization value having correlation with a size of an image file generated among quantization values included in at least first quantization data from the plurality of quantization circuits; a quantization coefficient control circuit for generating a plurality of reference control coefficients set to be different values for controlling the quantization coefficients of the plurality of quantization circuits and generating control coefficients based on counts of the plurality of counters and a reference value of the quantization value having correlation with a size of an image file generated set in advance; a quantization coefficient generation circuit for generating a plurality of first quantization values of different values based on a reference quantization coefficient set in advance and the plurality of reference control coefficients from the quantization control circuits and supplying the same to corresponding quantization circuits, generating the second quantization coefficient based on a control coefficient and the reference quantization coefficient, and supplying the same to one specific quantization circuit among the plurality of quantization circuits when receiving a control coefficient from the quantization coefficient control circuit; and an entropy coding circuit for entropy coding on the second quantization data from the quantization circuit which received the second quantization coefficient.

Preferably, a specific counter for counting a quantization value of quantization data of a specific quantization circuit to which the second quantization coefficient is supplied further counts the number of a quantization value having correlation with a size of an image file generated among quantization values included in the second quantization data from the specific quantization circuit; the quantization coefficient control circuit again generates a control coefficient based on the number of the quantization value having correlation with a size of an image file generated included in the second quantization data from the specific counter and the reference value and outputs a control signal indicating that the control coefficient is again generated to the entropy coding circuit; the quantization coefficient generation circuit again generates a second quantization coefficient based on the again generated control coefficient and the reference quantization coefficient and supplies it to the specific quantization circuit; the specific quantization circuit quantizes an output signal of the compression circuit based on the again generated second quantization coefficient and outputs the quantization data to the entropy coding circuit; and the entropy coding circuit performs entropy coding on quantization data based on the again generated second quantization coefficient upon receiving the control signal.

According to a third aspect of the present invention, there is provided an image pickup system, comprising an image pickup means for obtaining an image of an object; a signal processing circuit for converting image data from the image pickup means to digital data; and an image compression controller comprising; a compression circuit for compressing redundancy of the input image data for coding, a quantization circuit for first quantization based on a first quantization coefficient and second quantization based on a second quantization coefficient on an output signal of the compression circuit, a counter for counting the number of a quantization value having correlation with a size of an image file generated among quantization values included at least in the first quantization data from the above quantization circuit, a quantization coefficient control circuit for generating a control coefficient based on the count of the counter and a reference value of a quantization value having correlation with a size of an image file generated set in advance, a quantization coefficient generation circuit for supplying a reference quantization coefficient set in advance as the first quantization coefficient to the quantization circuit, generating the second quantization coefficient based on the control coefficient and the reference quantization coefficient, and supplying the same to the quantization circuit when receiving a control coefficient from the quantization coefficient control circuit, and an entropy coding circuit for entropy coding on the second quantization data from the quantization circuit.

According to a fourth aspect of the present invention, there is provided an image pickup s system, comprising an image pickup means for obtaining an image of an object; a signal processing circuit for converting image data from the image pickup means to digital data; and an image compression controller comprising a compression circuit for compressing redundancy of the digital image data from the above signal processing circuit for coding, a plurality of quantization circuits for first quantization based on a first quantization coefficient and second quantization based on a second quantization coefficient by a specific circuit on an output signal of the compression circuit, a plurality of counters for each counting the number of a quantization value having correlation with a size of an image file generated among quantization values included in at least first quantization data from the plurality of quantization circuits, a quantization coefficient control circuit for generating a plurality of reference control coefficients set to be different values for controlling the quantization coefficients of the plurality of quantization circuits and generating control coefficients based on counts of the plurality of counters and a reference value of the quantization value having correlation with a size of an image file generated set in advance, a quantization coefficient generation circuit for generating a plurality of first quantization values of different values based on a reference quantization coefficient set in advance and the plurality of reference control coefficients from the quantization control circuits and supplying the same to corresponding quantization circuits, generating the second quantization coefficient based on a control coefficient and the reference quantization coefficient, and supplying the same to one specific quantization circuit among the plurality of quantization circuits when receiving a control coefficient from the quantization coefficient control circuit, and an entropy coding circuit for entropy coding on the second quantization data from the quantization circuit which received the second quantization coefficient.

In each of the above aspects of the invention, there is further provided a memory for storing an output signal of the compression circuit and able to be accessed by the quantization circuits.

In each of the above aspects of the invention, the quantization value counted by the counter is "0" and the entropy coding circuit performs Huffman coding.

That is, according to the present invention, image data obtained by an image pickup means such as a CCD is supplied as digital data to a compression circuit.

In the compression circuit, the redundancy of the input image data is compressed and coded and the result is output to one or more quantization circuits.

In the quantization circuit, the quantization is performed by using a first quantization coefficient based on a reference quantization coefficient generated in the quantization coefficient generation circuit, and the first quantization data is supplied to a counter.

In the counter, a quantization value having a correlation with the size of the image file made, for example, the number "0", among quantization values included in a first quantization data from the quantization circuit is counted, and the count is output to the quantization coefficient control circuit.

In the quantization coefficient control circuit, a control coefficient is generated based on the count of the counter and a reference value of a quantization value having correlation with a size of an image file generated set in advance and this is supplied to the quantization coefficient generation circuit.

In the quantization coefficient generation circuit supplied with the control coefficient, a second quantization coefficient is generated based on the control coefficient and reference quantization coefficient and it is supplied to a specific quantization circuit.

In the quantization circuit, the second quantization is performed based on a second quantization coefficient and the second quantization data is supplied to an entropy coding circuit for entropy coding.

Also, in the present invention, in a specific counter for counting a quantization value of quantization data of a specific quantization circuit supplied with a second quantization coefficient, the number of a quantization value having correlation with a size of an image file to be generated among the quantization values included in the second quantization data from the specific quantization circuit is further counted and the count is supplied to the quantization coefficient control circuit.

In the quantization coefficient control circuit, the control coefficient is reproduced based on the number of a quantization value having correlation with a size of an image file to be generated included in the second quantization data of the counter and a reference value and it is output to the quantization coefficient generation circuit and a control signal indicating that the control coefficient is reproduced is output to the entropy coding circuit.

In the quantization coefficient generation circuit a second quantization coefficient is reproduced based on the reproduced control coefficient and a reference quantization coefficient and it is supplied to a specific quantization circuit.

In the specific quantization circuit, the quantization is performed with respect to an output signal of the compression circuit based on the reproduced second quantization coefficient and the quantization data is output to the entropy coding circuit.

Then, in the entropy coding circuit, a control signal is received and entropy coding is performed with respect to on the quantization data based on the reproduced second quantization coefficient.

Also, in the present invention, the output signal of the compression circuit is stored in a memory. At the time of the second quantization or later, for example, the data stored in the memory is read by the quantization circuit, and the read data is quantized.

BRIEF DESCRIPTION OF THE DRAWINGS

These and other objects and features of the present invention will become clearer from the following description of the preferred embodiments given with reference to the accompanying drawings, in which:

FIG. 5 is a view of a size of a JPEG file and the number of "0's" included in data immediately after quantization respectively obtained when generating a quantization coefficient by using 10 kinds of control coefficients for a reference quantization table in the quantization process;

FIG. 6 is a view of the relationship of a JPEG size and "0" count based on FIG. 5;

DESCRIPTION OF THE PREFERRED EMBODIMENTS

Below, preferred embodiments will be described with reference to the accompanying drawings.

First Embodiment

Figure 1:
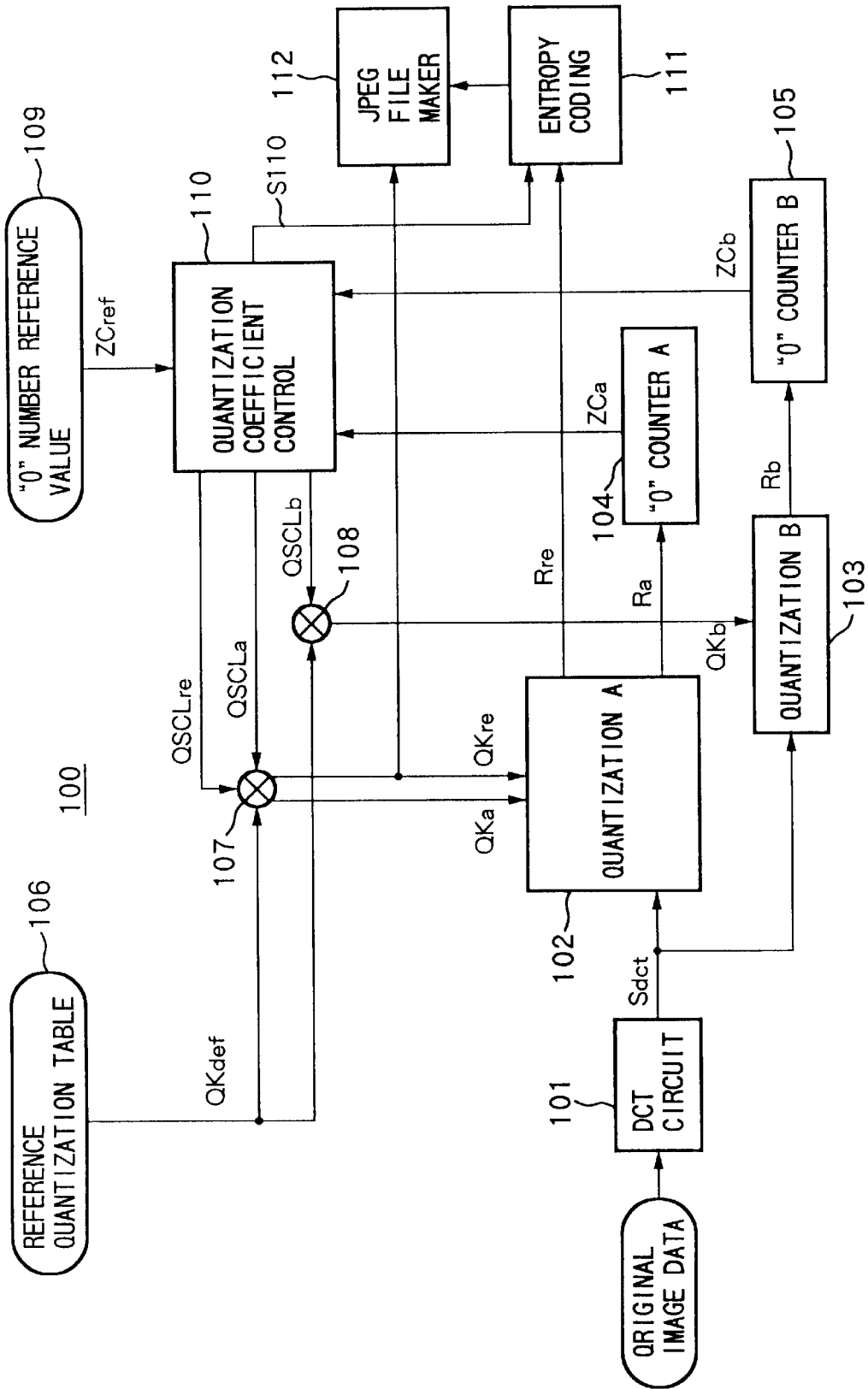
FIG. 1 is a block diagram of a first embodiment of an image compression controller according to the present invention.

FIG. 1 is a block diagram of a first embodiment of an image compression controller according to the present invention.

The image compression controller 100 comprises, as shown in FIG. 1, a DCT circuit 101 serving as a compression circuit, a first quantization circuit (quantization A) 102, a second quantization circuit (quantization B) 103, a first "0" counter (A) 104, a second "0" counter (B) 105, a reference quantization table 106 stored in a storage circuit, a first multiplier 107 and a second multiplier 108 serving as quantization coefficient generating circuits, a "0" number reference value generation circuit 109, a quantization coefficient control circuit 110, an entropy coding circuit 111, and a JPEG file maker 112.

The DCT circuit 101 performs discrete cosine transform on input original data and successively outputs the result as data Sdct to the first quantization circuit 102 and the second quantization circuit 103.

The first quantization circuit 102 quantizes the data Sdct from the DCT circuit 101 based on a first quantization coefficient QKa given by the first multiplier 107 at the time of initialization (at the time of the first quantization processing) and outputs the result as quantization data Ra to the "0" counter 104.

Also, the first quantization circuit 102 quantizes the data Sdct based on a second quantization coefficient QKre given by the first multiplier 107 at the time of the second quantization processing and outputs the result as quantization data Rre to the entropy coding circuit 111.

The second quantization circuit 103 quantizes the data Sdct from the DCT circuit 101 based on the first quantization coefficient QKb given by the second multiplier 108 and outputs the result as quantization data Rb to the "0" counter 105.

The "0" counter 104 counts the number of "0's" in the quantization data Ra from the first quantization circuit 102 and, after finishing counting all the quantization data, outputs a "0" count ZCa to the quantization coefficient control circuit 110.

The "0" counter 105 counts the number of "0's" in the quantization data Rb from the second quantization circuit 103 and, after finishing counting all of the quantization data, outputs the "0" count ZCb to the quantization coefficient control circuit 110.

The reason why the "0" counters 104 and 105 count the "0's" is that when using Huffman coding as the entropy coding performed later, the value having correlation with the size of an output file in the quantization values included in the quantization data is the "0".

Huffman coding is characterized in that, due to the algorithm, the larger the "0" count, the higher the compression rate. Therefore, it counts the "0's" in the quantization value, as explained later, controls the quantization coefficient with reference to the "0" count, calculates this again, and then starts the final compression.

The reference quantization table 106 is stored in a not shown storage circuit. For example, 128 reference quantization coefficients are set, and a value QKdef is given to the first multiplier 107 and the second multiplier 108.

The first multiplier 107 multiplies the quantization coefficient value QKdef from the reference quantization table by a reference control coefficient QSCLa set by the quantization coefficient control circuit 110 at the time of initialization (at the time of the first quantization processing) to generate a first quantization coefficient QKa which it outputs to the first quantization circuit 102.

Also, the first multiplier 107 multiplies the quantization coefficient value QKdef from the reference quantization table with a control coefficient QSCLre, as explained later, calculated in the quantization coefficient control circuit 110 and giving a "0" count ZCref expected to be smaller than the desired JPEG data size, to thereby generate a second quantization coefficient QKre which it outputs to the first quantization circuit 102.

The second multiplier 108 multiplies the quantization coefficient value QKdef from the reference quantization table with the reference control coefficient QSCLb set by the quantization coefficient control circuit 110 to generate a quantization coefficient QKb which it outputs to the second quantization circuit 103.

The "0" number reference value generation circuit 109 generates a "0" number expected to be smaller than the desired JPEG data size as a reference value ZCref and supplies this to the quantization coefficient control circuit 110.

The quantization coefficient control circuit 110 generates reference coefficients QSCLa and QSCLb set to be mutually different values at the time of initialization and outputs them to the first multiplier 107 and the second multiplier 108.

Also, based on the "0" count ZCa by the first "0" counter 104, "0" count ZCb by the second "0" counter 105, and "0" number reference value ZCb by the "0" number reference value generation circuit 109, it generates a control coefficient QSCLre for obtaining "0" number ZCref expected to be smaller than the desired JPEG data size and outputs this to the first multiplier 107 and, also, outputs a signal S110 indicating that fact to the entropy coding circuit 111.

The entropy coding circuit 111 assigns codes to the quantization data Rre from the first quantization circuit 102 so that the average code length becomes short and outputs the coded data to the JPEG file maker 112.

The entropy coding circuit 111 performs, for example, Huffman coding.

Huffman coding is characterized in that, due to the algorithm, the larger the "0" count, the higher the compression rate. The value having correlation with a size of an output file among the plurality of bit values included in the quantization data is the "0".

The JPEG file maker 112 makes a JPEG file based on the data quantized based on the second quantization coefficient QKre from the first multiplier 107 and entropy coded to a size of the desired size or less.

The quantization coefficient control in the above quantization coefficient control circuit 110 will be explained in more detail below with reference to the drawings.

In the first embodiment, in JPEG compression on a still picture as an original image, the controller controls the quantization coefficient so that the output JPEG data becomes a specific size and counts the number of "0's" included in the quantized data during that process.

Figure 2:
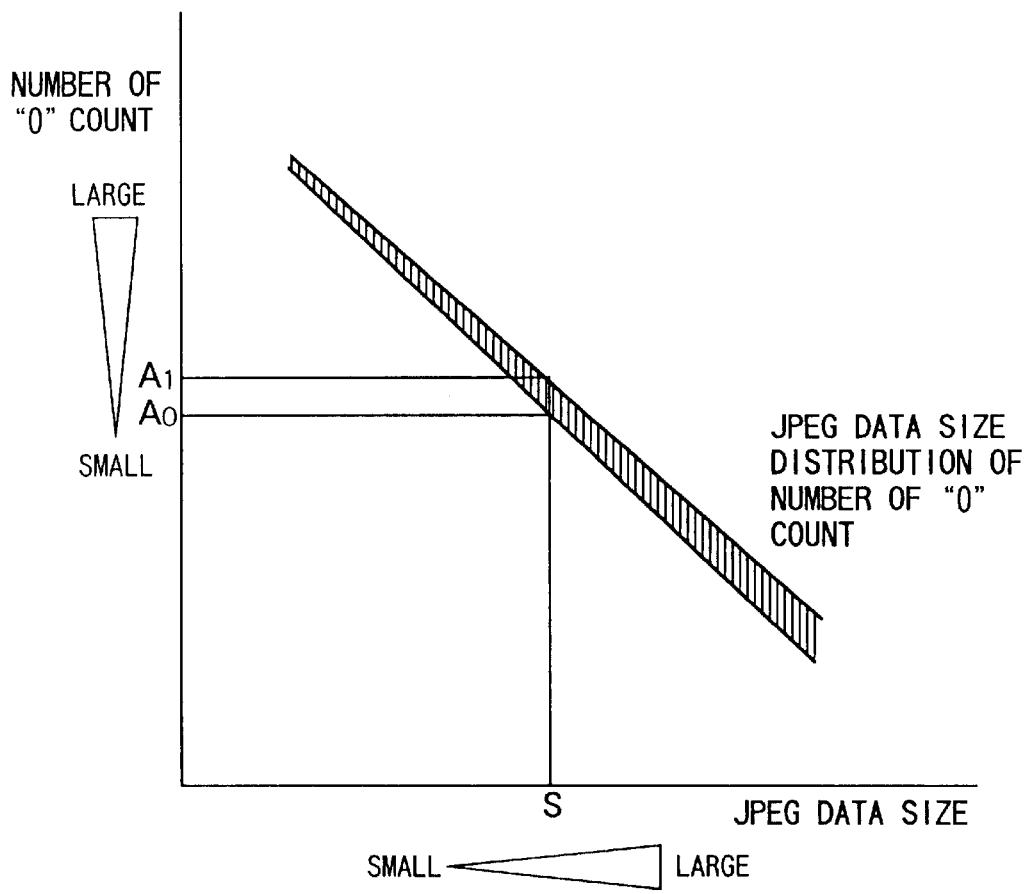
FIG. 2 is a view of the trend in the number of "0's" in data after quantization with respect to the size of JPEG data.

If doing this for a variety of original images, as shown in FIG. 2, it is found that the number of "0's" in quantized data for the size of the obtained JPEG data tends to concentrate in a certain range.

In FIG. 2, the abscissa indicates the JPEG data size, and the ordinate indicates the "0" On count. The number of "0's" in the quantization data when the JPEG size is S is distributed the range of A0 to A1.

Thus, when desiring to hold the JPEG data size down to S or less, it is sufficient to be able to set the quantization coefficient so that the number of "0's" in the quantization data becomes larger than A1.

Next, a case of compression of a still image by the present controller will be explained.

As explained above, the "0" count at quantization becomes ZCa with a reference control coefficient ZSCLa and becomes ZCb with a reference control coefficient ZSCLb.

Figure 3:
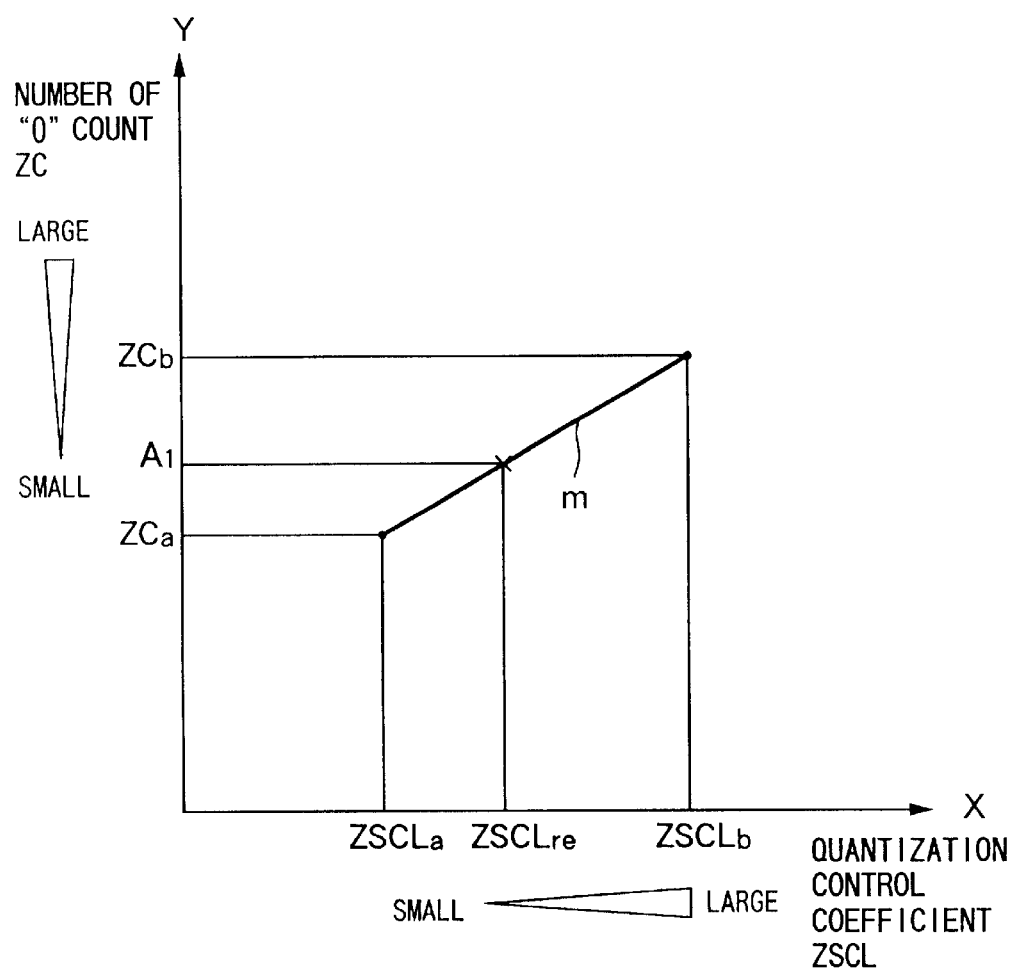
FIG. 3 is a view of the relationship between a quantization control coefficient and a "0" count when plotting a "0" count ZCa at the time of quantization by a quantization control coefficient ZSCLa and a "0" count ZCb at the time of quantization by ZSCLb so that the abscissa (X) axis becomes the quantization control coefficient and the ordinate (Y) axis becomes the "0" count.

FIG. 3 is a view of the relationship between the quantization control coefficient and the "0" count when plotting them so that the abscissa (X) axis becomes the quantization control coefficient and the ordinate (Y) axis becomes the "0" count and connecting the two points.

Assuming that "'0' count=function of quantization control coefficient" from the line m in FIG. 3, the following relationships are obtained:

$$ZCa = \alpha \cdot ZSCLa + \beta \quad ZCb = \alpha \cdot ZSCLb + \beta \quad (1)$$

The following formula can be derived from these relationships:

$$Y = (ZCa \cdot (ZSCLb - X) + ZCb \cdot (X - ZSCLa))/(ZSCLb - ZSCLa) \quad (2)$$

The following formula can also be derived from this:

$$X = (ZSCLa \cdot (ZCb - Y) + ZSCLb \cdot (Y - ZCa))/(ZCb - ZCa) \quad (3)$$

The control coefficient value ZSCLre for attaining a JPEG size of S or less, that is, an "0" count of the quantization data of A1 or more, can be obtained by entering A1, that is, the "0" reference value ZCref, in Y in the above formula (3).

Next, the operation resulting from the above configuration will be explained with reference to the timing chart in FIG. 4.

The input original image data is subjected to a discrete cosine transform by the DCT circuit 11 and the result successively output as data Sdct to the first quantization circuit 102 and the second quantization circuit 103 (ST11 and ST12).

At this time, in the first multiplier 107, the quantization coefficient value QKdef from the reference quantization table is multiplied with the reference control coefficient QSCLa set by the quantization coefficient control circuit 110 at the time of initialization (at the time of the first quantization) to generate a first quantization coefficient QKa and the quantization coefficient QKa is supplied to the first quantization circuit 102.

Also, in the second multiplier 108, the quantization coefficient value QKdef from the reference quantization table is multiplied with the reference control coefficient QSCLb set by the quantization coefficient control circuit 110 at the time of initialization to generate a first quantization coefficient QKb and the quantization coefficient QKb is supplied to the second quantization circuit 103.

In the first quantization, the data Sdct from the DCT circuit 101 is quantized based on the quantization coefficient QKa given by the first multiplier 107 (ST13) and the result is output as quantization data Ra to the "0" counter 104 by the first quantization circuit 102.

Also, in the second quantization circuit 103, the data Sdct from the DCT circuit 101 is quantized based on the quantization coefficient QKb given by the second multiplier 108 (ST13) and the result is output as quantization data Rb to the "0" counter 105.

In the "0" counter 104, the number of "0's" in the quantization data Ra from the first quantization circuit 102 is counted (ST15) and, after finishing counting all of the quantization data, a "0" count ZCa is output to the quantization coefficient control circuit 110.

Also, in the "0" counter 105, the number of "0's" in the quantization data Rb from the second quantization circuit 103 is counted (ST15) and, after finishing counting all of the quantization data, a "0" count ZCb is output to the quantization coefficient control circuit 110.

For the second quantization, based on the "0" count ZCa from the first "0" counter 104, "0" count ZCb from the second "0" counter 105, and "0" number reference value ZCref given by the "0" number reference value generation circuit 109, in the quantization coefficient control circuit 110, a control coefficient QSCLre for obtaining a "0" number ZCref expected to be smaller than the desired JPEG size is generated and this is output to the first multiplier 108 (ST16).

Also, in the quantization coefficient control circuit 110 a signal S110 indicating that the control coefficient QSCLre for controlling the second quantization has been generated and output is generated and this is output to the entropy coding circuit 111.

In the first multiplier 107, a second quantization coefficient QKdef from the reference quantization table is multiplied with a control coefficient QSCLre calculated in the quantization coefficient control circuit 110 for obtaining the "0" number ZCref expected to be smaller than the desired JPEG size so as to generate a second quantization coefficient QKre and this is supplied to the first quantization circuit 102.

In the first quantization circuit 102, the data Sdct after discrete cosine transform at the DCT circuit 101 is again quantized based on the second quantization coefficient QKre given by the first multiplier 107 at the time of the second quantization and the result is output as quantization data Rre to the entropy coding circuit 111 (ST13 and ST14).

In the entropy coding circuit 111, when receiving the signal S110 from the quantization coefficient control circuit 110, codes are assigned to the quantization data Rre from the first quantization circuit 102 so that the average code length becomes shorter and the coded data is output to the JPEG file maker 112.

Then, in the JPEG file maker 17, a JPEG file is made and output based on the entropy coded image data of the size smaller than the set size (ST18).

As a result, the JPEG data finally output after being the entropy coding becomes close to the desired size.

Figure 4:
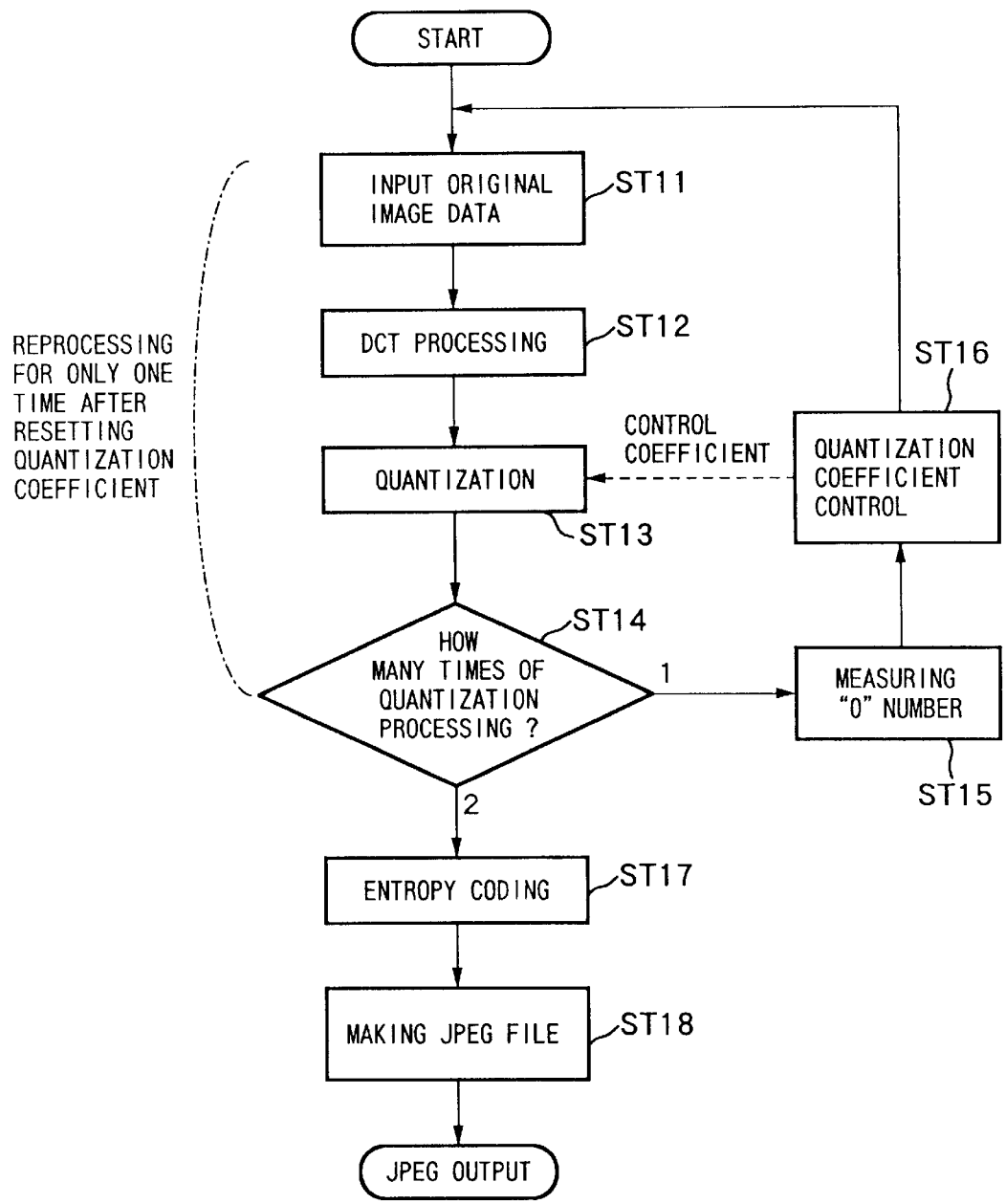
FIG. 4 is a flow chart for explaining an operation of the controller in FIG. 1.
Figure 14:
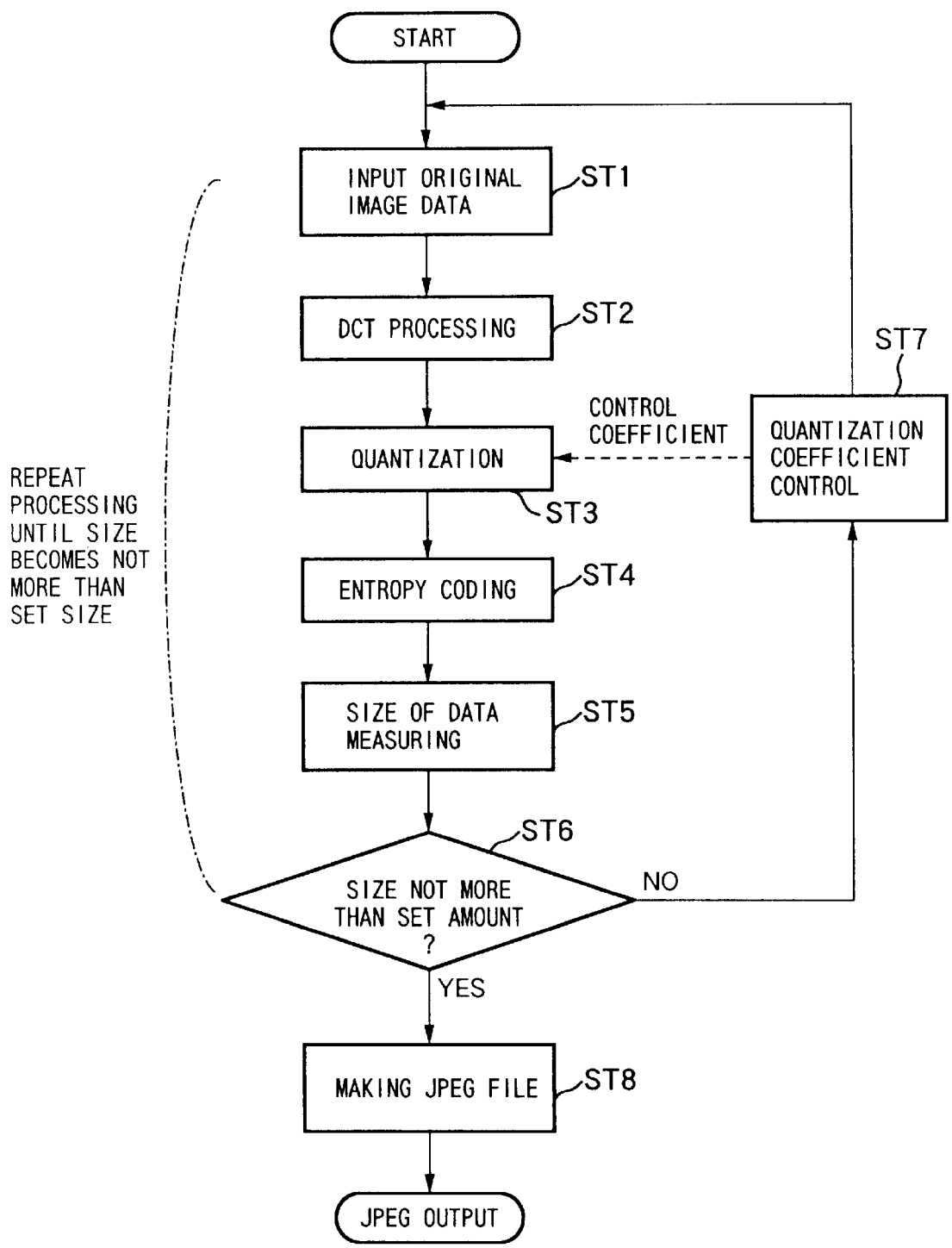
FIG. 14 is a flow chart for explaining the operation of the controller of FIG. 13.

As will be understood by comparing the flow chart in FIG. 4 with the flow chart in FIG. 14 showing the operation of a controller of the related art, in the flow chart of FIG. 4 according to the first embodiment, the entropy coding is performed only once. Further, the re-processing until quantization, resulting from the previous "0" count and quantization coefficient control, ends with only one repetition.

Thus, the number of processing processes until the output of the JPEG data is constant and a high speed is attained by reducing the number.

Here, a specific example of the above operation will be explained with reference to FIGS. 5 to 8.

In this example, eight kinds of samples of original still images having a size of 480×480 and an input format of 4·2·2 (a size of 460,800 bytes) are compressed in accordance with the JPEG baseline format.

In the quantization, 10 kinds of control coefficients are used to generate quantization coefficients for the reference quantization table 106.

FIG. 5 is a view of the sizes of the obtained JPEG files and the number of "0's" included in the data immediately after quantization.

Also, FIG. 6 is a view of the relationship of the JPEG size and "0" count based on FIG. 5.

Here, when looking at the "0" count of a part having, for example, a compression rate of 90%, a size of 46 KB (size of JPEG data is 1/10th of about 460 KB of original data), as shown in FIGS. 5 and 6, the distribution is between 435,000 and 440,000.

As a result, when processing conditional on a compression rate of 90% or more (JPEG size less than 1/10th of original image), it is sufficient if the quantization coefficient can be set so that the number of "0's" of the quantized data becomes at least 440,000.

Figure 7:
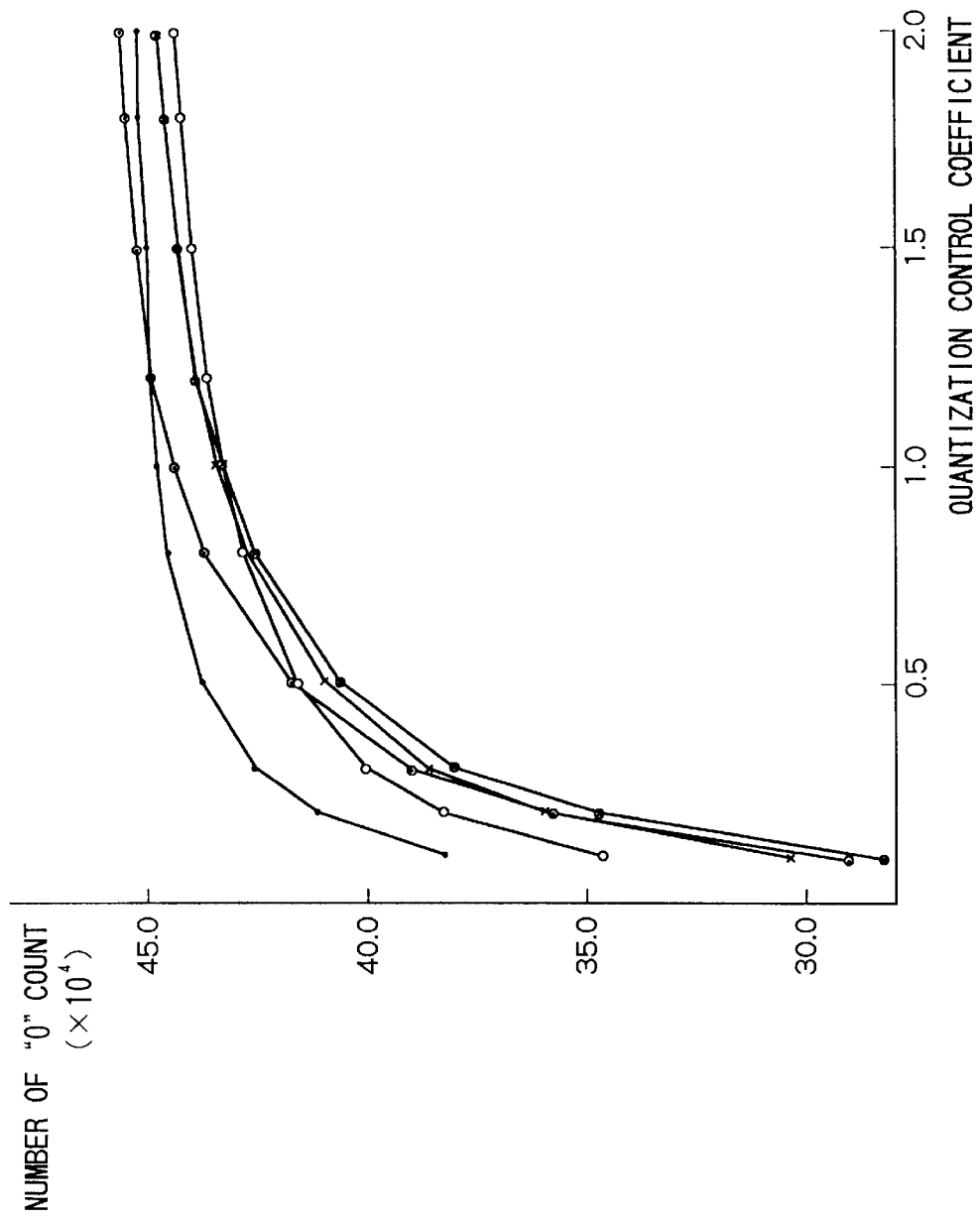
FIG. 7 is a view of a quantization control coefficient and "0" count of samples from FIG. 5.

Also, FIG. 7 is a view of the quantization control coefficients and "0" counts for the samples obtained from FIG. 5.

As will be understood from FIG. 7, while a curve is drawn in an area with a particularly small control coefficient (less than 0.5), it becomes approximately a straight line above that.

Therefore, it is understood that when quantizing an input image using more than one kind of control coefficient and obtaining the "0" count, a control coefficient satisfying the targeted "0" count (for example, 440,000) can be calculated.

As explained above, since the characteristics of the quantization control coefficient and the "0" count are actually curves, when using a quantization control coefficient obtained by straight approximation, the "0" count actually becomes the aimed value or more, namely, the JPEG size becomes small. However, since the goal is originally "control so that the target size is not exceeded", no problem is caused and rather a safety margin is secured.

When quantizing again by using the calculated control coefficient, a "0" count of the conditional "0" count or more and a JPEG data size of less than the targeted size can be obtained.

Figure 8:
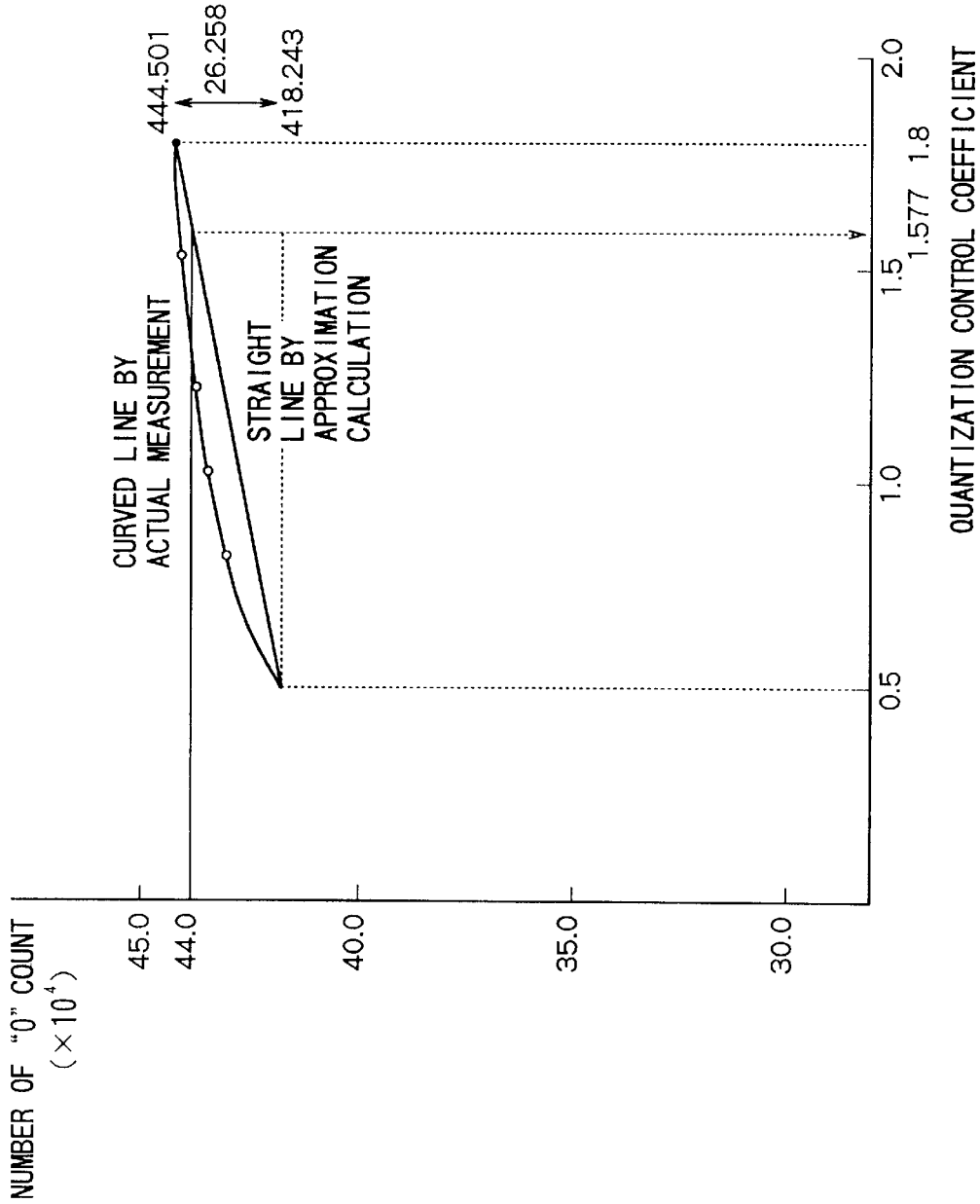
FIG. 8 is a view of the relationship of a quantization control coefficient and "0" count when controlling the compression rate to 90% in a new sample image.

FIG. 8 is a view of the relationship of the quantization control coefficient and "0" count when controlling the compression rate to 90% for a new sample image.

In this example, a DCT processing was performed and the "0" count of the quantization data by the quantization control coefficient of 0.5 and 1.8 became 418,243 and 444,501.

When calculating the quantization control coefficient giving a "0" count of 440,000 from formula (3), the result is the control coefficient ZSCLre=1.577 (curve with circle marks is relation of an actual coefficient to "0" count).

When producing JPEG data after performing quantization one more time by a control coefficient ZSCLre of 1.577, the final JPEG file size was 43 KB.

As explained above, according to the first embodiment, by providing a DCT circuit 101 for discrete cosine transform of input original image data, a first quantization circuit 102 for quantizing data Sdct from the DCT circuit 101 based on a quantization coefficient QKa given by a first multiplier 107 at the time of first quantization and outputting the same as quantization data Ra to a "0" counter 104 and for quantizing the data Sdct based on a quantization coefficient QKre given by the first multiplier 107 at the time of the second quantization and outputting the same as quantization data Rre to an entropy coding circuit 111, a second quantization circuit 103 for quantizing the data Sdct from the DCT circuit 101 based on a quantization coefficient QKb given by a second multiplier 108 and outputting the same as quantization data Rb to a "0" counter 105, the first "0" counter 104 for counting the number of "0's" in the quantization data Ra from the first quantization circuit 102 and outputting a "0" count ZCa, the second "0" counter 105 for counting the number of "0's" in the quantization data Rb from the second quantization circuit 103 and outputting a "0" count ZCb, the first multiplier 107 for multiplying a quantization coefficient value QKdef from a reference quantization table with a control coefficient QSCLa set by a quantization coefficient control circuit 110 at the time of the first quantization to generate a quantization coefficient QKa which it outputs to the first quantization circuit 102 and multiplying the quantization coefficient value QKdef from the reference quantization table with a control coefficient QSCLre calculated in the quantization coefficient control circuit 110 at the time of second quantization to generate a quantization coefficient QKre which it outputs to the first quantization circuit 102, the second multiplier 108 for multiplying the quantization coefficient value QKdef from the reference quantization table with a control coefficient QSCLb set by the quantization coefficient control circuit 110 to generate a quantization coefficient QKb which it outputs to the second quantization circuit 103, and the quantization coefficient control circuit 110 for generating control coefficients QSCLa and QSCLb and outputting them to the first multiplier 107 and the second multiplier 108 at the time of initialization, generating a control coefficient QSCLre for obtaining a "0" number ZCref expected to be smaller than the desired JPEG data size based on the "0" count ZCa from the first "0" counter 104, "0" count ZCb from the second "0" counter 105, and "0" reference value ZCref from the "0" number reference value generation circuit 109 and outputting the same to the first multiplier 107 and, further, outputting a signal S110 indicating that fact to the entropy coding circuit 111 and by configuring the controller so as to limit entropy coding to one time, the following effects can be obtained.

Namely, in compression with a limit on the final size, the final size can be estimated in the middle of image compression and the processing thereby made simpler.

Also, since entropy coding can be removed from the circuit loop for compression and the number of the loops can be made the minimum, a high speed can be attained in the image compression as a whole.

Also, the processing process can be reduced so the power consumption can be reduced.

Furthermore, the types of quantization table values used in compression can be reduced.

Also, reducing the size more than necessary (higher compression rate) can be suppressed, thus there are the advantages that the image quality can be improved and a storage device can be efficiently used.

Furthermore, if system able to give a certain margin in the processing time, since the overall processing time is reduced as explained above, it becomes possible to give an extra margin to the processing speed in the entropy coding or DCT processor, accordingly there is an advantage that the circuit can be made smaller by that amount.

Second Embodiment

Figure 9:
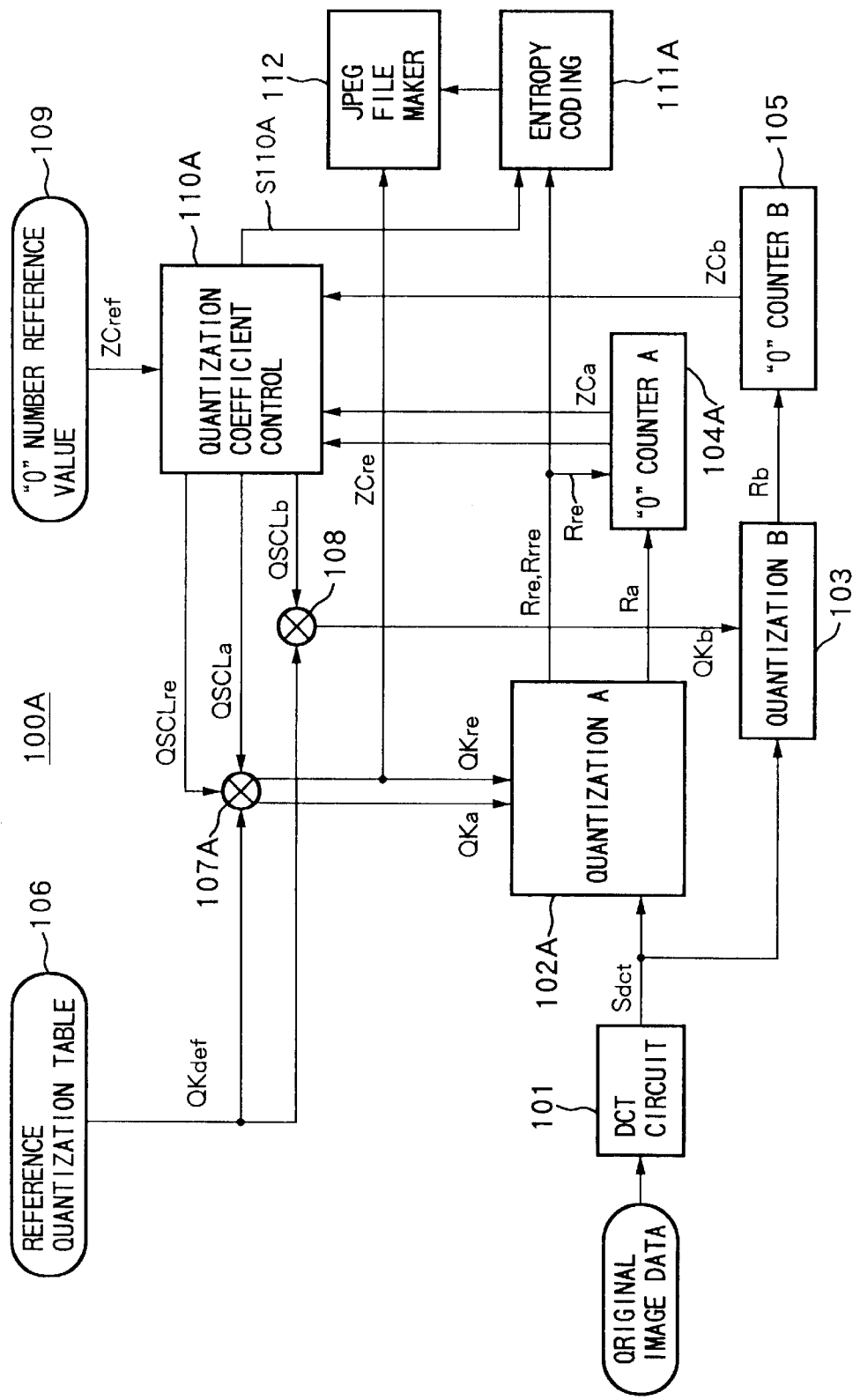
FIG. 9 is a block diagram of a second embodiment of an image compression controller according to the present invention.

FIG. 9 is a block diagram of a second embodiment of an image compression controller according to the present invention.

The point of difference of the second embodiment from the above first embodiment is that it is configured to input also quantization data Rre obtained by the second quantization in the first quantization circuit 102 to the "0" counter 104 in counting the "0"s so as to supply the count ZCre to the quantization coefficient control circuit 110A and thereby control the JPEG data size by a higher precision.

Specifically, a first counter 104A further counts the "0"s included in second quantization data Rre by a first quantization circuit 102A and outputs the count ZCre to a quantization coefficient control circuit 110A.

The quantization coefficient control circuit 110A again generates a control coefficient OSCLre based on the count ZCre and "0" reference value ZCref and outputs a control signal S110A indicating that the control coefficient is generated again to the entropy coding circuit 111A.

Also, the first multiplier 107A multiplies the again generated control coefficient OSCLre with the reference quantization coefficient QKdef to generate a second quantization coefficient QKre which it supplies to the first quantization circuit 102A.

The first quantization circuit 102A quantizes an output signal from the DCT circuit 101 based on the again generated second quantization coefficient and outputs the quantized data Rrre to the entropy coding circuit 111A.

The entropy coding circuit 111A performs entropy coding on the quantized data based on the again generated quantization coefficient QKre upon reception of the control signal S110A.

According to the first embodiment, when desiring to strictly control the JPEG data size, it is sometimes necessary to change the quantization coefficient and perform the processing again if the JPEG data obtained as a result is larger than or much smaller than the estimated amount. According to the second embodiment, however, a "0" count ZCre of the second quantization data Rre can be used as a correction parameter of the coefficient control, thus, in addition to the same effects as in the above first embodiment, there is the advantage that the JPEG data size can be controlled with a high precision.

Third Embodiment

Figure 10:
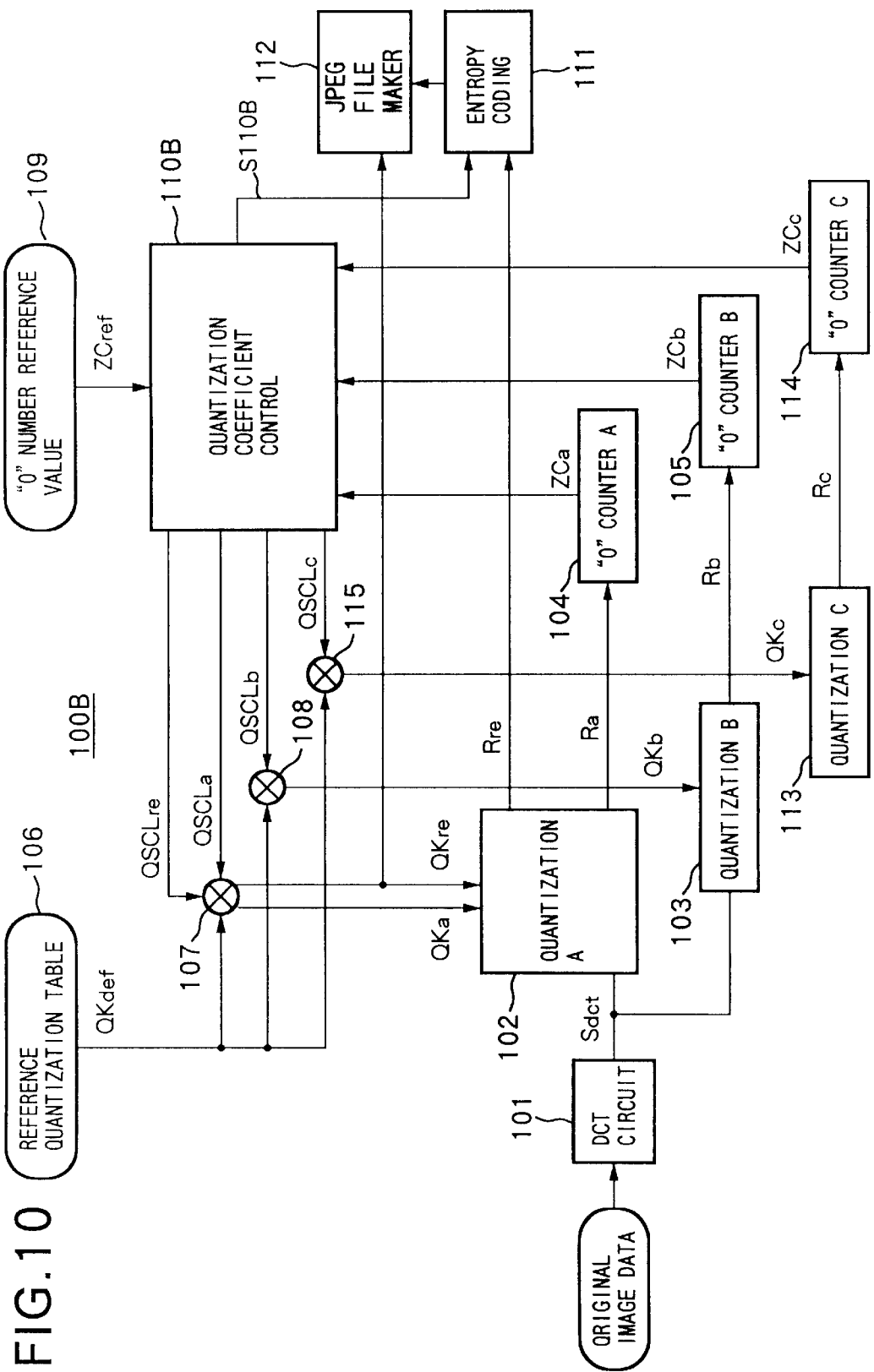
FIG. 10 is a block diagram of a third embodiment of an image compression controller according to the present invention.

FIG. 10 is a block diagram of a third embodiment of an image compression controller according to the present invention.

The point of difference of the third embodiment from the first embodiment is that a third quantization circuit 113, a third "0" counter 114, and a third multiplier 115 are further provided.

The rest of the configuration is the same as that in the first embodiment.

According to this configuration, since the parameters for calculating the control coefficient are increased, it becomes possible to improve the accuracy in calculating the control coefficient QSCLre in the quantization coefficient control circuit 110 and, as a result, the difference between the number of "0"s included in the second quantization data Rre and the reference value ZCre can be narrowed.

As explained above, according to the third embodiment, in addition to the same effects as in the above first embodiment, the JPEG data size can be further precisely controlled.

Fourth Embodiment

Figure 11:
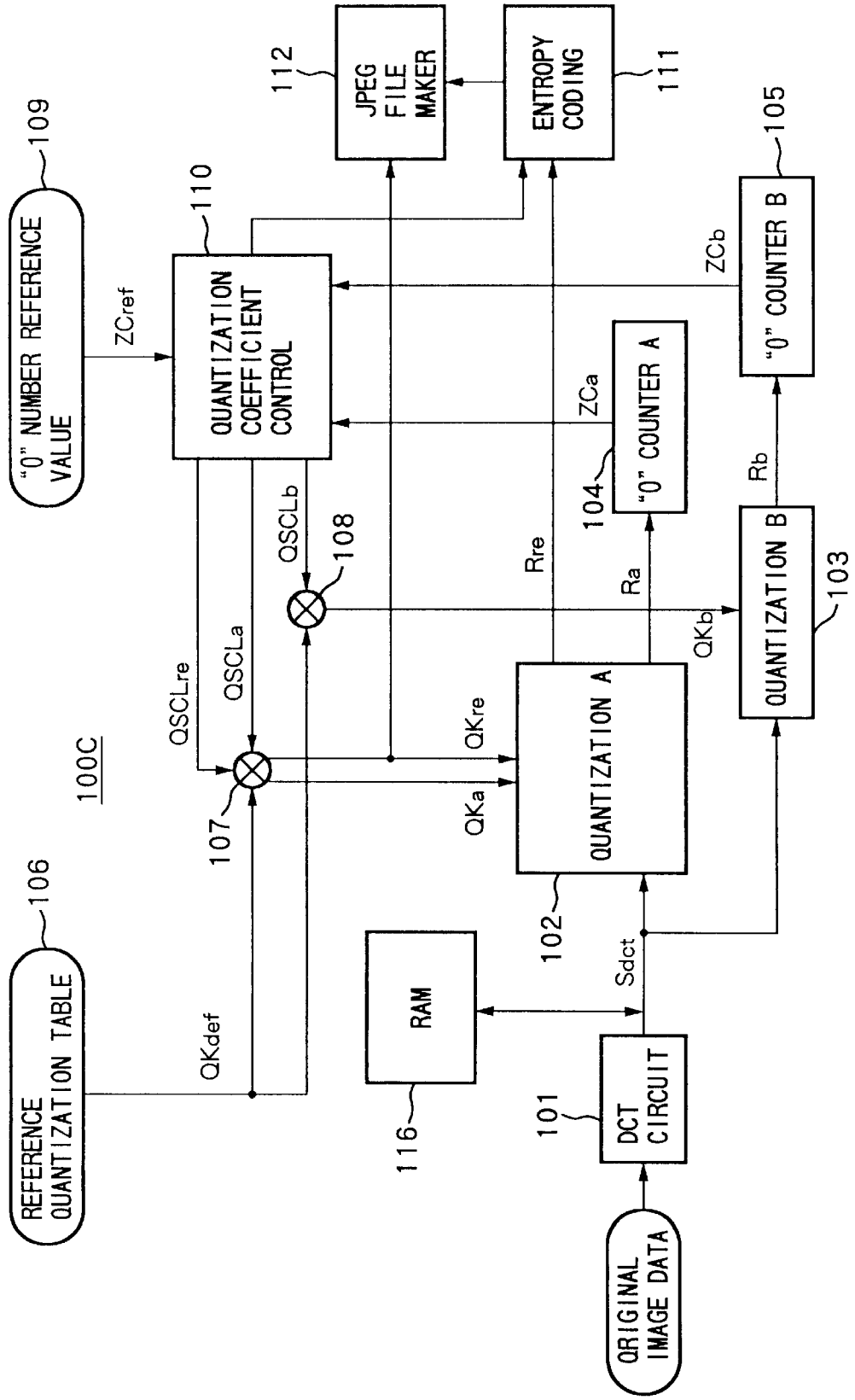
FIG. 11 is a block diagram of a fourth embodiment of an image compression controller according to the present invention.

FIG. 11 is a block diagram of a fourth embodiment of an image compression controller according to the present invention.

The point of difference of the fourth embodiment from the first embodiment is that a RAM 116 for storing data after DCT processing is provided between the DCT circuit 101 and the first and second quantization circuits 102 and 103.

In the first embodiment, the output Sdct of the DCT circuit 111 had to be input from the beginning, that is, the DCT processing had to be performed again, in the second quantization for calculating quantization data Rre.

As opposed to this, in the fourth embodiment, by storing the data Sdct after the DCT processing in the RAM 116, the DCT processing does not have to be performed again at the time of quantization of Rre calculation. It is sufficient to read the data from the RAM 116.

Note that the RAM 116 is only sequentially accessed, so a DRAM and SRAM can be also used.

According to the fourth embodiment, in addition to the same effects as in the first embodiment, a higher speed can be further attained in the processing.

Note that the configurations according to the above second, third, and fourth embodiments can be appropriately combined.

Figure 12:
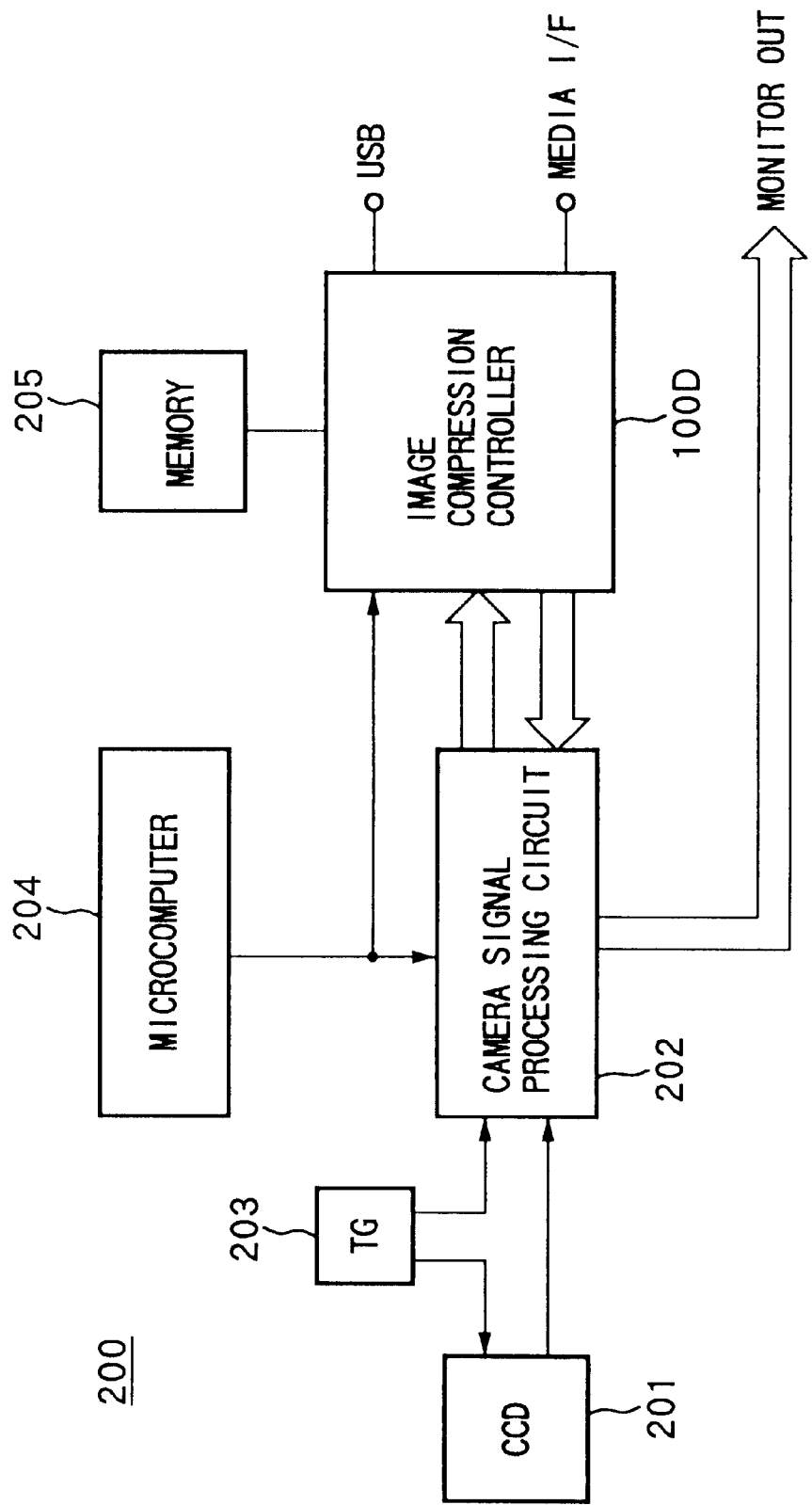
FIG. 12 is a block diagram of an example of the configuration of a digital still camera system using an image compression controller according to the present invention.
Figure 13:
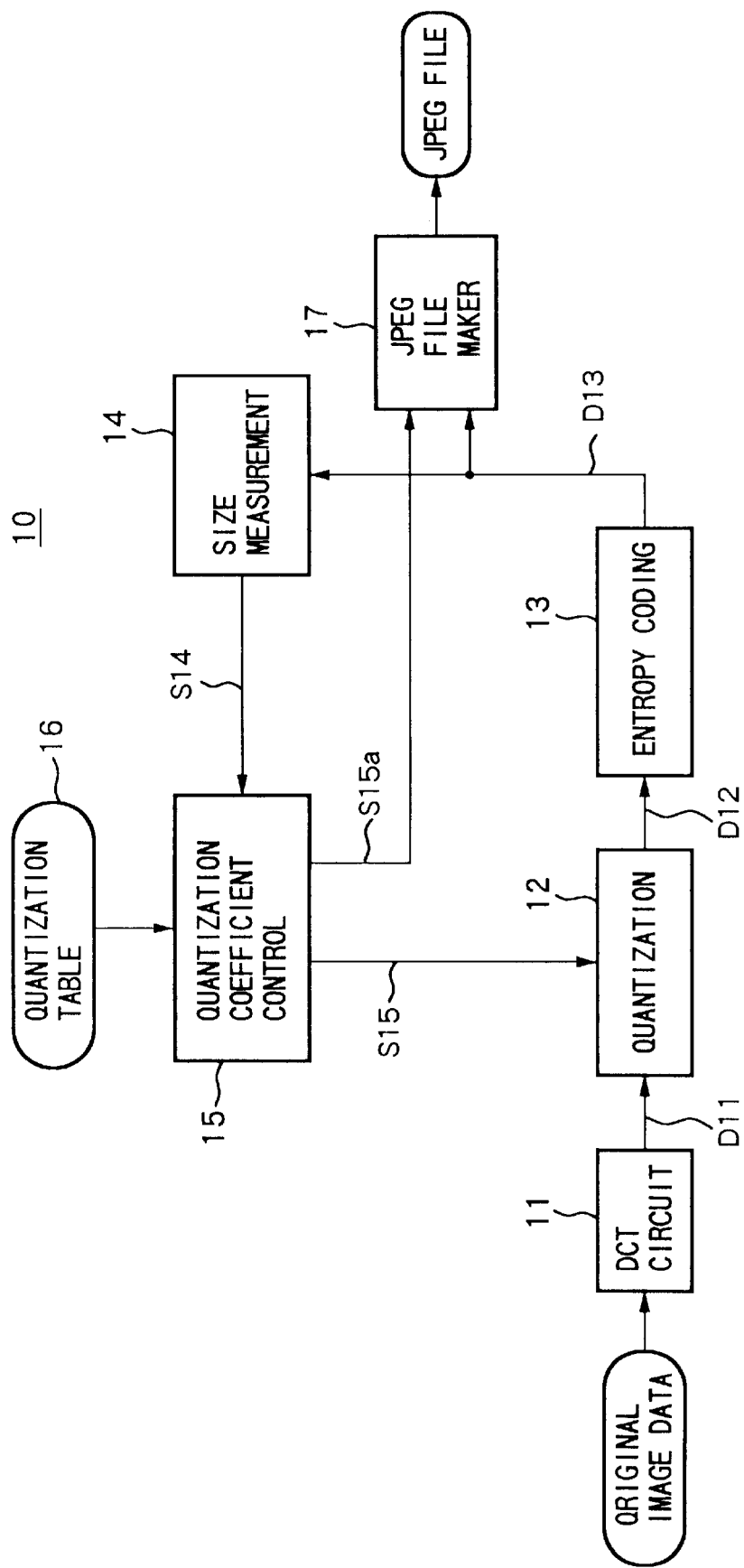
FIG. 13 is a block diagram of an example of the configuration of an image compression controller of the related art.

Also, it is possible to use an image compression controller 100D having a configuration according to the above first, second, third, and fourth embodiments or configured by appropriately combining those for a digital still camera system as shown in FIG. 12.

The digital still camera system 200 comprises an image pickup portion 201 having a charge coupled device (CCD), a camera signal processing circuit 202 for predetermined processing on an image obtained by the image pickup portion 201, supplying the original image data as digital data to an image compression controller 100D, and outputting JPEG data from the image compression controller 100D to a monitor side, a timing signal generation circuit (TG) 203 for generating a timing signal for establishing synchronization of the image pickup portion 201 and the camera signal processing circuit 202, a microcomputer 204 for controlling the signal processing circuit 202 and the image compression controller 100D, and a storage 205 having an SDRAM for storing the JPEG data etc.

Also, the image compression controller 100D is connected for example to a universal serial bus (USB), a predetermined media interface (I/F), etc.

In the present digital still camera system 200, since the image compression controller 100D attaining the effects explained in the embodiments is used, it is possible to obtain data of a still image having a high picture quality at a high speed.

Summarizing the effects of the invention, as explained above, according to the present invention, entropy coding can be removed from a circuit loop for compression and the number of loops can be kept to a minimum, so a high speed can be attained in the overall image compression.

Also, the power consumption can be reduced due to reduction of the processing process.

Furthermore, the types of quantization table values used in compression can be reduced.

Also, reducing the size by more than necessary (higher compression rate) can be suppressed, thus there are advantages that the image can be improved and a storage device can be efficiently used.

Furthermore, when a system able to give a certain margin in the processing time, since the overall processing time is reduced as explained above, it becomes possible to give an extra margin to the processing speed in the entropy coding or DCT processor, accordingly there is the advantage that the circuit can be made smaller by that amount.

While the invention has been described with reference to specific embodiment chosen for purpose of illustration, it should be apparent that numerous modifications could be made thereto by those skilled in the art without departing from the basic concept and scope of the invention.

What is claimed is:

1. An image compression controller for compressing image data to generate an image file having a size smaller than a set size, comprising:
   a compression circuit for compressing redundancy of input image data for coding;
   a quantization circuit for first quantization based on a first quantization coefficient and second quantization based on a second quantization coefficient on an output signal of the compression circuit;
   a counter for counting the number of a quantization value having correlation with a size of an image file generated among quantization values included at least in first quantization data from the quantization circuit;
   a quantization coefficient control circuit for generating a control coefficient based on the count of said counter and a reference value of a quantization value having correlation with a size of an image file generated set in advance;
   a quantization coefficient generation circuit for supplying a reference quantization coefficient set in advance as said first quantization coefficient to said quantization circuit, generating said second quantization coefficient based on the control coefficient and said reference quantization coefficient, and supplying the same to said quantization circuit when a control coefficient from said quantization coefficient control circuit is received; and
   an entropy coding circuit for entropy coding on the second quantization data from said quantization circuit.

2. An image compression controller as set forth in claim 1, wherein:
   said counter further counts the number of a quantization value having correlation with the size of the image file generated among quantization values included in the second quantization data from said quantization circuit;
   said quantization coefficient control circuit again generates a control coefficient based on the number of a quantization value having correlation with the size of the image file generated included in the second quantization data from said counter and said reference value and outputs a control signal indicating that the control coefficient is again generated to said entropy coding circuit;
   said quantization coefficient generation circuit again generates a second quantization value based on the again generated control coefficient and said reference quantization coefficient;
   said quantization circuit quantizes an output signal of said compression circuit based on the again generated second quantization coefficient and outputs the quantization data to said entropy coding circuit; and
   said entropy coding circuit performs entropy coding on the quantization data based on the again generated second quantization coefficient upon receiving said control signal.

3. An image compression controller as set forth in claim 1, further comprising a memory for storing an output signal of said compression circuit and able to be accessed by said quantization circuit.

4. An image compression controller as set forth in claim 2, further comprising a memory for storing an output signal of said compression circuit and able to be accessed by said quantization circuit.

5. An image compression controller as set forth in claim 1, wherein the quantization value to be counted by said counter is "0" and said entropy coding circuit performs Huffman coding.

6. An image compression controller as set forth in claim 2, wherein the quantization value to be counted by said counter is "0" and said entropy coding circuit performs Huffman coding.

7. An image compression controller as set forth in claim 3, wherein the quantization value to be counted by said counter is "0" and said entropy coding circuit performs Huffman coding.

8. An image compression controller for compressing image data to generate an image file having a size smaller than a set size, comprising:
   a compression circuit for compressing redundancy of input image data for coding;
   a plurality of quantization circuits for first quantization based on a first quantization coefficient and second quantization based on a second quantization coefficient by a specific circuit on an output signal of said compression circuit;
   a plurality of counters for each counting the number of a quantization value having correlation with a size of an image file generated among quantization values included in at least first quantization data from said plurality of quantization circuits;
   a quantization coefficient control circuit for generating a plurality of reference control coefficients set to be different values for controlling the quantization coefficients of said plurality of quantization circuits and generating control coefficients based on counts of said plurality of counters and a reference value of the quantization value having correlation with a size of an image file generated set in advance;
   a quantization coefficient generation circuit for generating a plurality of first quantization values of different values based on a reference quantization coefficient set in advance and the plurality of reference control coefficients from said quantization control circuits and supplying the same to corresponding quantization circuits, generating said second quantization coefficient based on a control coefficient and said reference quantization coefficient, and supplying the same to one specific quantization circuit among said plurality of quantization circuits when receiving a control coefficient from said quantization coefficient control circuit; and an entropy coding circuit for entropy coding on the second quantization data from the quantization circuit which received said second quantization coefficient.

9. An image compression controller as set forth in claim 8, wherein:

a specific counter for counting a quantization value of quantization data of a specific quantization circuit to which said second quantization coefficient is supplied further counts the number of a quantization value having correlation with a size of an image file generated among quantization values included in the second quantization data from said specific quantization circuit;

said quantization coefficient control circuit again generates a control coefficient based on the number of the quantization value having correlation with a size of an image file generated included in the second quantization data from said specific counter and said reference value and outputs a control signal indicating that the control coefficient is again generated to said entropy coding circuit;

said quantization coefficient generation circuit again generates a second quantization coefficient based on the again generated control coefficient and said reference quantization coefficient and supplies it to said specific quantization circuit;

said specific quantization circuit quantizes an output signal of said compression circuit based on the again generated second quantization coefficient and outputs the quantization data to said entropy coding circuit; and said entropy coding circuit performs entropy coding on quantization data based on the again generated second quantization coefficient upon receiving said control signal.

10. An image compression controller as set forth in claim 8, further comprising a memory for storing an output signal of said compression circuit and able to be accessed by said quantization circuits.

11. An image compression controller as set forth in claim 9, further comprising a memory for storing an output signal of said compression circuit and able to be accessed by said quantization circuits.

12. An image compression controller as set forth in claim 8, wherein the quantization value counted by said counter is "0" and said entropy coding circuit performs Huffman coding.

13. An image compression controller as set forth in claim 9, wherein the quantization value counted by said counter is "0" and said entropy coding circuit performs Huffman coding.

14. An image compression controller as set forth in claim 10, wherein the quantization value counted by said counter is "0" and said entropy coding circuit performs Huffman coding.

15. An image pickup system, comprising:

an image pickup means for obtaining an image of an object;

a signal processing circuit for converting image data from said image pickup means to digital data; and an image compression controller comprising;

a compression circuit for compressing redundancy of the input image data for coding, a quantization circuit for first quantization based on a first quantization coefficient and second quantization based on a second quantization coefficient on an output signal of the compression circuit, a counter for counting the number of a quantization value having correlation with a size of an image file generated among quantization values included at least in the first quantization data from the quantization circuit, a quantization coefficient control circuit for generating a control coefficient based on the count of said counter and a reference value of a quantization value having correlation with a size of an image file generated set in advance, a quantization coefficient generation circuit for supplying a reference quantization coefficient set in advance as said first quantization coefficient to said quantization circuit, generating said second quantization coefficient based on the control coefficient and said reference quantization coefficient, and supplying the same to said quantization circuit when receiving a control coefficient from said quantization coefficient control circuit, and an entropy coding circuit for entropy coding on the second quantization data from said quantization circuit.

16. An image pickup system as set forth in claim 15, wherein:

the counter of said image compression controller further counts the number of a quantization value having correlation with a size of an image file generated among quantization values included in second quantization data from said quantization circuit;

said quantization coefficient control circuit again generates a control coefficient based on the number of the quantization value having correlation with a size of an image file generated included in the second quantization data from said counter and said reference value and outputs a control signal indicating that the control coefficient is again generated to said entropy coding circuit;

said quantization coefficient generation circuit again generates a second quantization coefficient based on the again generated control coefficient and said reference quantization coefficient and supplies the same to said quantization circuit;

said quantization circuit quantizes an output signal of said compression circuit based on the again generated second quantization value and outputs the quantization data to said entropy coding circuit; and said entropy coding circuit performs entropy coding on quantization data based on the again generated second quantization coefficient upon receiving said control signal.

17. An image pickup system as set forth in claim 15, comprising a memory for storing an output signal of a compression circuit of said image compression controller and able to be accessed by said quantization circuit.

18. An image pickup system as set forth in claim 16, comprising a memory for storing an output signal of a compression circuit of said image compression controller and able to be accessed by said quantization circuit.

19. An image pickup system, comprising:
- an image pickup means for obtaining an image of an object;
- a signal processing circuit for converting image data from said image pickup means to digital data; and
- an image compression controller comprising:
  - a compression circuit for compressing redundancy of the digital image data from the above signal processing circuit for coding,
  - a plurality of quantization circuits for first quantization based on a first quantization coefficient and second quantization based on a second quantization coefficient by a specific circuit on an output signal of said compression circuit,
  - a plurality of counters for each counting the number of a quantization value having correlation with a size of an image file generated among quantization values included in at least first quantization data from said plurality of quantization circuits,
  - a quantization coefficient control circuit for generating a plurality of reference control coefficients set to be different values for controlling the quantization coefficients of said plurality of quantization circuits and generating control coefficients based on counts of said plurality of counters and a reference value of the quantization value having correlation with a size of an image file generated set in advance,
  - a quantization coefficient generation circuit for generating a plurality of first quantization values of different values based on a reference quantization coefficient set in advance and the plurality of reference control coefficients from said quantization control circuits and supplying the same to corresponding quantization circuits, generating said second quantization coefficient based on a control coefficient and said reference quantization coefficient, and supplying the same to one specific quantization circuit among said plurality of quantization circuits when receiving a control coefficient from said quantization coefficient control circuit, and
  - an entropy coding circuit for entropy coding on the second quantization data from the quantization circuit which received said second quantization coefficient.

20. An image pickup system as set forth in claim 19, wherein
- a specific counter for counting a quantization value of quantization data of a specific quantization circuit to which said second quantization coefficient is supplied further counts the number of a quantization value having correlation with a size of an image file generated among quantization values included in the second quantization data from said specific quantization circuit;
- said quantization coefficient control circuit again generates a control coefficient based on the number of the quantization value having correlation with a size of an image file generated included in the second quantization data from said specific counter and said reference value and outputs a control signal indicating that the control coefficient is again generated to said entropy coding circuit;
- said quantization coefficient generation circuit again generates a second quantization coefficient based on the again generated control coefficient and said reference quantization coefficient and supplies it to said specific quantization circuit;
- said specific quantization circuit quantizes an output signal of said compression circuit based on the again generated second quantization coefficient and outputs the quantization data to said entropy coding circuit; and
- said entropy coding circuit performs entropy coding on quantization data based on the again generated second quantization coefficient upon receiving said control signal.

21. An image pickup system as set forth in claim 19, further comprising a memory for storing an output signal of a compression circuit of said image compression controller and able to be accessed by said quantization circuits.

22. An image pickup system as set forth in claim 20, further comprising a memory for storing an output signal of a compression circuit of said image compression controller and able to be accessed by said quantization circuits.

* * * * *